(12) United States Patent
Irimoto et al.

(10) Patent No.: US 9,185,299 B2
(45) Date of Patent: Nov. 10, 2015

(54) ELECTRONIC APPARATUS AND PROGRAM

(71) Applicant: Kabushiki Kaisha Toshiba, Tokyo (JP)

(72) Inventors: Yuuji Irimoto, Fussa (JP); Kohji Saiki, Kawasaki (JP); Motonobu Sugiura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 183 days.

(21) Appl. No.: 13/863,942

(22) Filed: Apr. 16, 2013

(65) Prior Publication Data

US 2014/0071312 A1 Mar. 13, 2014

(30) Foreign Application Priority Data

Sep. 7, 2012 (JP) ................. 2012-197888

(51) Int. Cl.
*H04N 5/232* (2006.01)
*H04N 5/77* (2006.01)
*H04N 21/45* (2011.01)
*H04N 21/482* (2011.01)
*H04N 21/81* (2011.01)
*H04N 21/84* (2011.01)
*G06T 11/60* (2006.01)
*G06T 17/05* (2011.01)

(52) U.S. Cl.
CPC ............ *H04N 5/23293* (2013.01); *G06T 11/60* (2013.01); *G06T 17/05* (2013.01); *H04N 5/772* (2013.01); *H04N 21/4524* (2013.01); *H04N 21/482* (2013.01); *H04N 21/8153* (2013.01); *H04N 21/84* (2013.04); *H04N 2201/3215* (2013.01); *H04N 2201/3253* (2013.01); *H04N 2201/3274* (2013.01)

(58) Field of Classification Search
CPC ..................... H04N 1/32128; H04N 5/23293
USPC ....................................... 348/231.5
See application file for complete search history.

(56) References Cited

FOREIGN PATENT DOCUMENTS

| JP | 3308247 | | 5/2002 |
|---|---|---|---|
| JP | 2011-145407 | | 7/2011 |
| JP | 2011145407 A | * | 7/2011 |
| JP | 2011-165176 | | 8/2011 |
| JP | 2012-034196 | | 2/2012 |
| JP | 2012034196 A | * | 2/2012 |

* cited by examiner

*Primary Examiner* — Roberto Velez
*Assistant Examiner* — Yih-Sien Kao
(74) *Attorney, Agent, or Firm* — Rutan & Tucker LLP; William W. Schaal

(57) ABSTRACT

According to one embodiment, an electronic apparatus includes a storage device which stores first image files includes location information and time information and a display processor which displays, on a screen, a map image, a plurality of objects on the map image, and lines on the map. Locations of the plurality of objects correspond to location information of the first image files. Shapes of the lines are determined based on location information and time information of the first image files. A line is drawn between a first object corresponding to first time information regarding a first timing of photographing and a second object corresponding to second time information regarding a second timing of photographing next to the first timing of photographing.

7 Claims, 9 Drawing Sheets

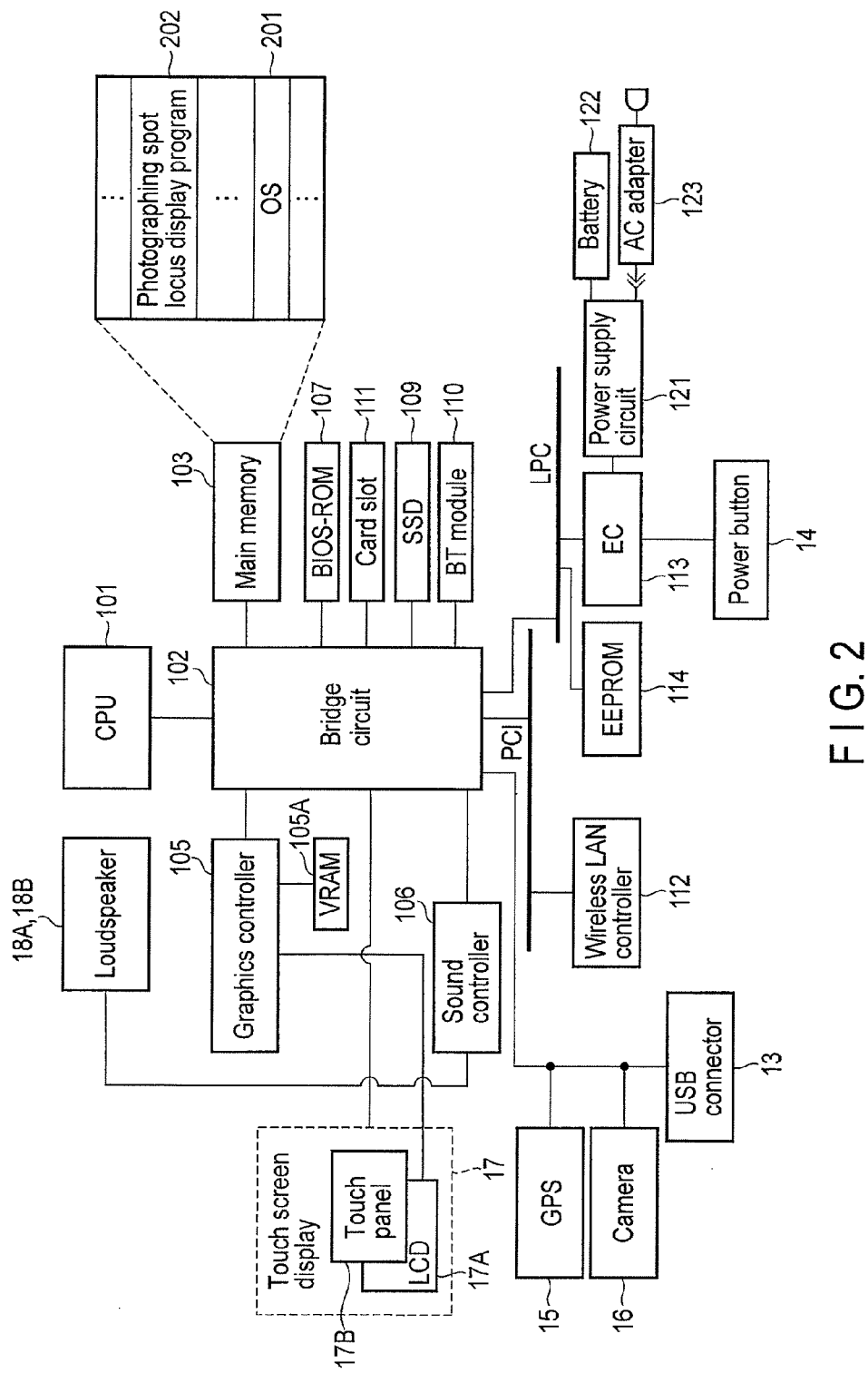
F I G. 2

ELECTRONIC APPARATUS AND PROGRAM

CROSS-REFERENCE TO RELATED APPLICATIONS

This application is based upon and claims the benefit of priority from Japanese Patent Application No. 2012-197888, filed Sep. 7, 2012, the entire contents of which are incorporated herein by reference.

FIELD

Embodiments described herein relate generally to an electronic apparatus and program, which display a photographing location of an image file on a map image.

BACKGROUND

Recently, digital cameras with GPS (Global Positioning System) and mobile terminals with a camera and GPS are becoming more prevalent. For this reason, the usage of image files embedded with GPS information (geotag information) is expected to increase. Also, date and time information indicating a photographing date and time is embedded in an image file.

Along with the increased usage of image files including geotag information, it is demanded to visually and intuitively confirm photographing locations in an order of photographing date and time.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing an example of the system arrangement of the electronic apparatus according to the embodiment.

DETAILED DESCRIPTION

Various embodiments will be described hereinafter with reference to the accompanying drawings.

In general, according to one embodiment, an electronic apparatus includes a storage device and a display processor. The storage device is configured to store first image files comprising location information regarding a location of photographing and time information regarding a timing of photographing. The display processor is configured to display, on a screen, a map image, a plurality of objects on the map image, and lines on the map. Locations of the plurality of objects correspond to location information of the first image files. Shapes of the lines are determined based on location information and time information of the first image files. A line is drawn between a first object corresponding to first time information regarding a first timing of photographing and a second object corresponding to second time information regarding a second timing of photographing next to the first timing of photographing.

The arrangement of an electronic apparatus according to this embodiment will be described first with reference to FIG. 1. This electronic apparatus can be implemented as a portable terminal, for example, a tablet type personal computer, laptop or notebook type personal computer, or PDA. The following description will be given under the assumption that this route search apparatus is implemented as a tablet type personal computer 10 (to be referred to as a computer 10 hereinafter).

Figure 1:
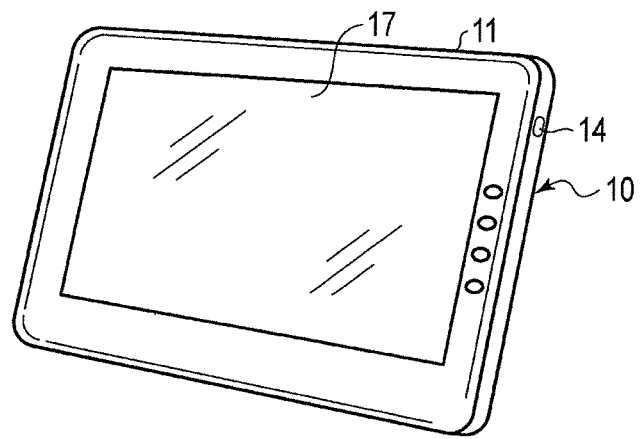
FIG. 1 is an exemplary perspective view showing an example of the outer appearance of an electronic apparatus according to an embodiment.

FIG. 1 shows the outer appearance of the computer 10. This computer 10 includes a computer main body 11 and touch screen display 17. The computer main body 11 has a low-profile box-shaped housing. On the surface of the computer main body 11, a power button 14 used to turn on/off a power supply of the computer 10 is arranged. The touch screen display 17 is disposed on the surface of the computer main body 11. The touch screen display 17 includes a flat panel display (for example, a liquid crystal display device (LCD)) and touch panel. The touch panel is arranged to cover the screen of the LCD. The touch panel is configured to detect a touch position on the touch screen display 17 by the finger of the user or a pen.

FIG. 2 is a block diagram showing an example of the system arrangement of the computer 10.

The computer 10 includes a CPU (Central Processing Unit) 101, bridge circuit 102, main memory 103, graphics controller (GPU) 105, sound controller 106, BIOS-ROM 107, SSD (Solid State Drive) 109, BT (Bluetooth®) module 110, card slot 111, wireless LAN controller 112, EC (Embedded Controller) 113, EEPROM 114, USB connector 13, touch screen display 17, video memory (VRAM) 105A, power button 14, and the like.

The CPU 101 is a processor which controls operations of respective units in the computer 10. The CPU 101 executes an OS (Operating System) 201 and various application programs, which are loaded from the SSD 109 as a storage device onto the main memory 103. The application programs include a photographing location locus display program 202.

The photographing location locus display program 202 sequentially displays pins (objects) at photographing locations on a map image in an order of photographing date and times based on geotags (GPS information, longitude/latitude) regarding locations of timing photographing locations and date and time information regarding a timing of photographing (photographing date and times), which are included in image files stored in the SSD 109. Also, the photographing location locus display program 202 displays a line between two pins having former and latter photographing date and times.

The CPU 101 also executes a BIOS (Basic Input/Output System) stored in the BIOS-ROM 107. The BIOS is a program required for hardware control.

The bridge circuit 102 is a bridge device which connects a local bus of the CPU 101, and respective devices on a PCI (Peripheral Component Interconnect) bus and those on an LPC (Low Pin Count) bus. Also, the bridge circuit 102 incorporates a serial ATA (Advanced Technology Attachment) controller required to control the SSD 109. Furthermore, the bridge circuit 102 has a function of executing communications with the sound controller 106. Also, the bridge circuit 102 has a function of executing communications with the GPU 105 via, for example, a PCIEXPRESS serial bus. Moreover, the bridge circuit 102 incorporates a USB (Universal Serial Bus) controller required to control a GPS (Global Positioning System) 15 and camera 16.

The GPS 15 receives signals transmitted from four or more GPS satellites, and measures the longitude/latitude of the current location based on the received signals.

The GPU 105 is a display controller which controls an LCD 17A used as a display monitor of the computer 10. A video signal (to be also referred to as a display signal hereinafter) generated by this GPU 105 is supplied to the LCD 17A.

The sound controller 106 is a sound source device, and outputs audio data to be played back to loudspeakers 18A and 18B. The wireless LAN controller 112 is a wireless communication device which executes wireless communications compliant with, for example, the IEEE802.11 standard.

The EC 113 is an embedded controller required for power management. The EC 113 has a function of turning on/off the power supply of the computer 10 in response to an operation of the power button 14 by the user. A power supply circuit 121 generates operation power to be supplied to respective components using electric power supplied from a battery 122 in the computer 10 or that supplied from an external power supply such as an AC adapter 123. The power supply circuit 121 also charges the battery 122 using electric power supplied from the external power supply.

The touch screen display 17 includes a touch panel 17B in addition to the LCD 17A. The touch panel 17B overlaid on the LCD 17A has a sensor, MCU (Micro Controller Unit), and the like. When the user makes a touch operation on the touch panel 17B, the touched position is detected by the sensor, and a touch controller outputs input information including that touched position on the touch panel 17B.

Figure 3:
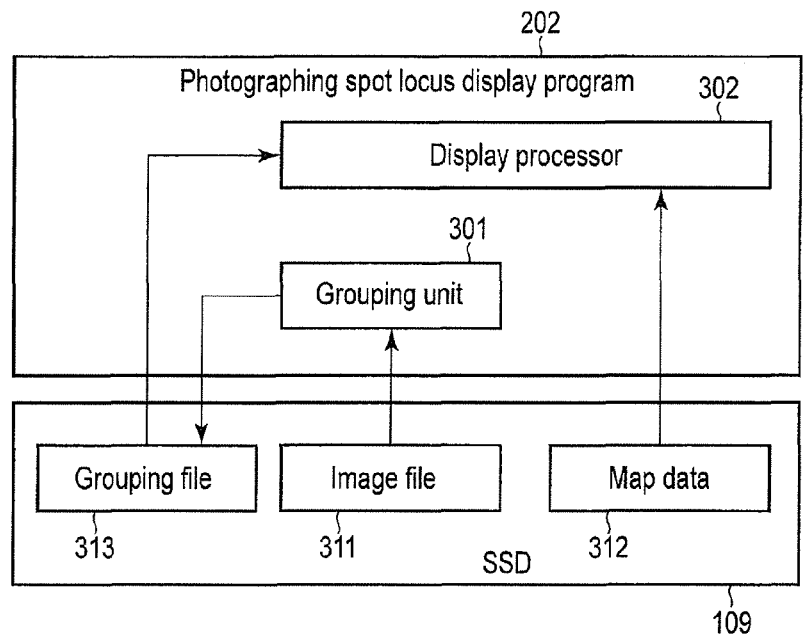
FIG. 3 is an exemplary block diagram showing the arrangement of a photographing location locus display program.

The arrangement of the photographing location locus display program 202 will be described below with reference to FIG. 3.

The photographing location locus display program 202 includes a grouping unit 301, display processor 302, and the like. The SSD 109 stores a plurality of image files 311 and map data 312. The format of each image file 311 is, for example, "EXIF" (Exchangeable Image File Format) of the JEITA standard. The EXIF image file is appended with date and time information indicating a photographing date and time, and a geotag indicating a longitude/latitude of a photographing location. The map data 312 stores data required to display maps, and data which associate locations on the map with longitudes/latitudes.

The grouping unit 301 groups a plurality of image files stored in a specific folder in the SSD 109 in accordance with geotag information and date and time information. In other words, the grouping unit 301 as a selection unit selects image files having the same photographing date and time or those having different photographing date and times but closer photographing locations from the plurality of image files.

The grouping unit 301 groups, for example, image files having the same photographing date and times into a single group. Also, the grouping unit 301 groups image files which have different photographing date and times but have photographing locations falling within a setting range into a single group. Note that the grouping unit 301 groups image files which were taken within a set time range into a single group. However, the grouping unit 301 groups image files having photographing date and times falling outside the set time range into another group. Also, the grouping unit 301 groups image files stored in the same folder into a single group. Moreover, the grouping unit 301 may execute grouping according to a path of image files.

The grouping unit 301 generates a grouping file 313 which describes paths of image files for respective groups. The grouping file 313 describes the paths of image files in turn from an image file having an oldest photographing date and time.

The display processor 302 displays an album image including balloons corresponding to respective groups based on the grouping file 313, image files 311, and map data 312. Each balloon includes thumbnail images of image files in a corresponding group, and a map image including photographing locations of the image files. The balloons are displayed along a time axis. Below the time axis, labels each indicating "year" and "month" are laid out. The user can browse the balloons by scrolling from left to right to see older times, and from right to left to see more recent times.

Figure 4:
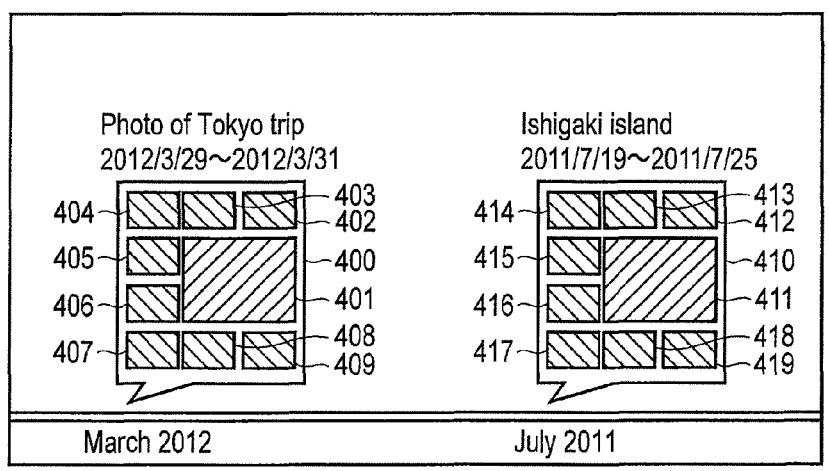
FIG. 4 is an exemplary view showing an example of an album screen.

FIG. 4 shows an example of the album screen.

As shown in FIG. 4, a first balloon 400 and second balloon 410 are displayed on the album screen. Within the first balloon 400, a map image 401 and thumbnail images 402, 403, 404, 405, 406, 407, 408, and 409 are displayed. Within the second balloon 410, a map image 411 and thumbnail images 412, 413, 414, 415, 416, 417, 418, and 419 are displayed.

When the user selects a certain balloon by a touch operation, the display processor 302 executes processing for displaying a photographing location locus display screen of image files in a group corresponding to the selected balloon on the LCD 17A based on the grouping file 313, image files 311, and map data 312.

On the photographing location locus display screen, a map image, and pins, which indicate photographing locations, are displayed at photographing locations on the map image. The pins correspond to pieces of geotag information included in pieces of EXIF information of image files in a group corresponding to the balloon selected by the touch operation. The pins are displayed in an order of photographing date and time based on pieces of date and time information included in the pieces of EXIF information of the image files in the group corresponding to the balloon selected by the touch operation.

Also, on the photographing location locus display screen, a balloon including a thumbnail image based on an image file is displayed on the map image when the pin is displayed. When the next pin is to be displayed, the display controller 302 controls to display a line which connects the former photographing location and a subsequent photographing location gradually from the previous pin on the display screen. After the line which connects the next and former pins is fully displayed, the next pin is displayed on the photographing location locus display screen. Then, a balloon including an image based on an image file corresponding to the next pin is displayed on the photographing location locus display screen.

FIGS. 5, 6, 7, and 8 show the photographing location locus display screen displayed on the display screen by the photographing location locus display program 202. The sequence for displaying a photographing location locus display screen by the photographing location locus display program 202 will be described below with reference to FIGS. 5, 6, 7, and 8. In this case, assume that the grouping unit 301 forms a group of nine image files.

Figure 5:
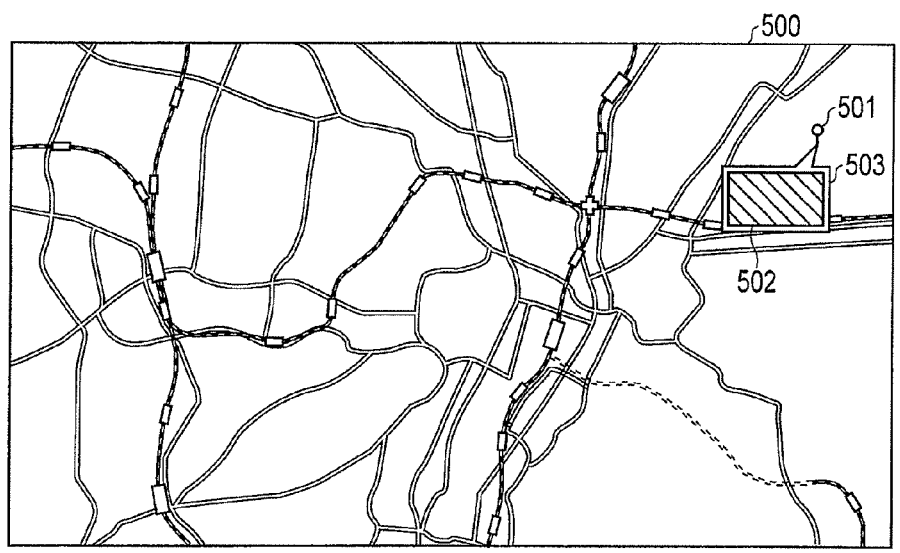
FIG. 5 is an exemplary view showing a photographing location locus display screen.

Initially, as shown in FIG. 5, a map image 500, a pin 501 on a photographing location of a first image file having the oldest photographing date and time in the group, and a balloon 503 including an image 502 of the first image file are displayed on the photographing location locus display screen.

Figure 6:
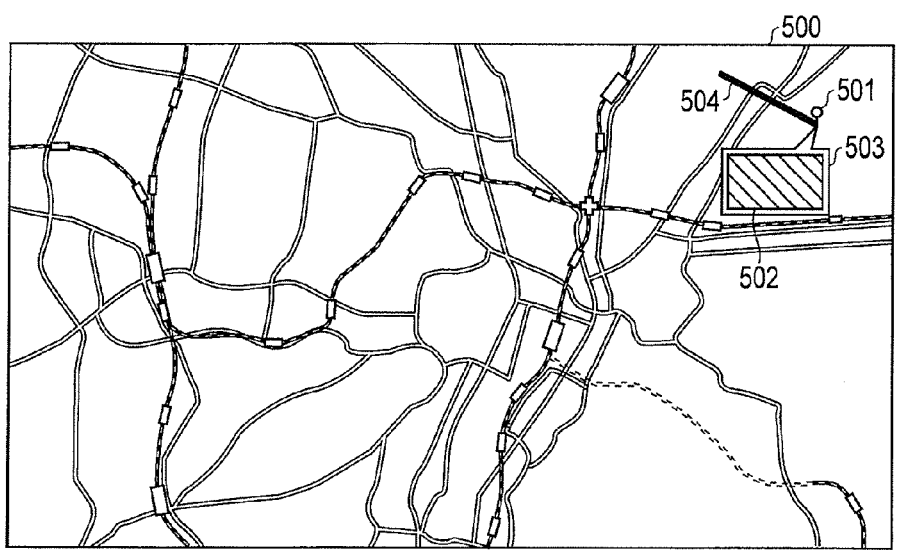
FIG. 6 is an exemplary view showing an example of the photographing location locus display screen.

As shown in FIG. 6, on the photographing location locus display screen, a line 504 which connects the pin 501 and a photographing location of a second image file having a photographing date and time next older than the first image file is gradually displayed from the pin 501 in addition to the image in FIG. 5. The line 504 is drawn between the pin 501 and the pin 511.

Figure 7:
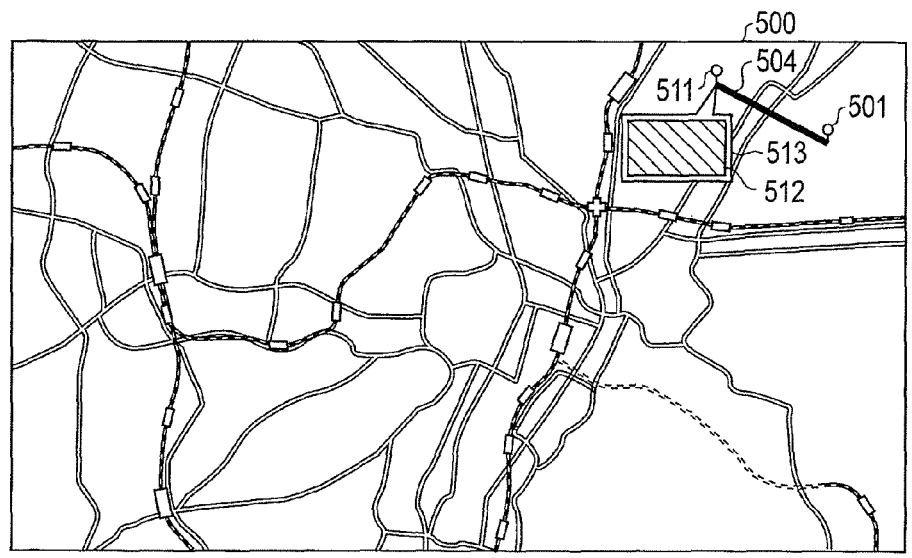
FIG. 7 is an exemplary view showing the example of the photographing location locus display screen.

After the line 504 is fully displayed, the map image 500, the pin 501, the line 504, a pin 511 on the photographing location of the second image file, and a balloon 513 including an image 512 of the second image file are displayed on the photographing location locus display screen, as shown in FIG. 7.

Figure 8:
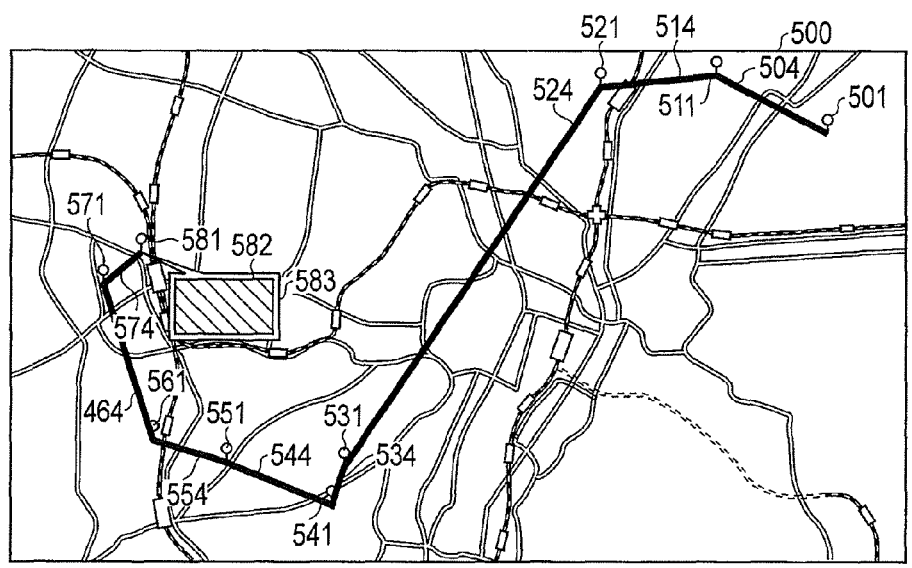
FIG. 8 is an exemplary view showing the example of the photographing location locus display screen.

Then, as shown in FIG. 8, on the photographing location locus display screen, the map image 500, the pin 501, the line 504, the pin 511 on the photographing location of the second image file, a line 514 which connects the pin 511 and a photographing location of a third image file having a photographing date and time next older than the second image file, a pin 521 on the photographing location of the third image file, a line 524 which connects the pin 521 and a photographing location of a fourth image file having a photographing date and time next older than the third image file, a pin 531 on the photographing location of the fourth image file, a line 534 which connects the pin 531 and a photographing location of a fifth image file having a photographing date and time next older than the fourth image file, a pin 541 on the photographing location of the fifth image file, a line 544 which connects the pin 541 and a photographing location of a sixth image file having a photographing date and time next older than the fifth image file, a pin 551 on the photographing location of the sixth image file, a line 554 which connects the pin 551 and a photographing location of a seventh image file having a photographing date and time next older than the sixth image file, a pin 561 on the photographing location of the seventh image file, a line 564 which connects the pin 561 and a photographing location of an eighth image file having a photographing date and time next older than the seventh image file, a pin 571 on the photographing location of the eighth image file, a line 574 which connects the pin 571 and a photographing location of a ninth image file having a photographing date and time next older than the eighth image file, a pin 581 on the photographing location of the ninth image file, and a balloon 583 including an image 582 of the ninth image file are sequentially displayed.

The line 524 is drawn between the pin 521 and the pin 531. The line 534 is drawn between the pin 531 and the pin 541. The line 544 is drawn between the pin 541 and the pin 551. The line 554 is drawn between the pin 551 and the pin 561. The line 564 is drawn between the pin 561 and the pin 571. The line 574 is drawn between the pin 571 and the pin 581. Shapes of lines 514, 524, 534, 544, 554, 564, and 574 are determined based on the geotag information and the date and time information of image files. The line 514 is drawn between the pin 511 and the pin 521.

Figure 9:
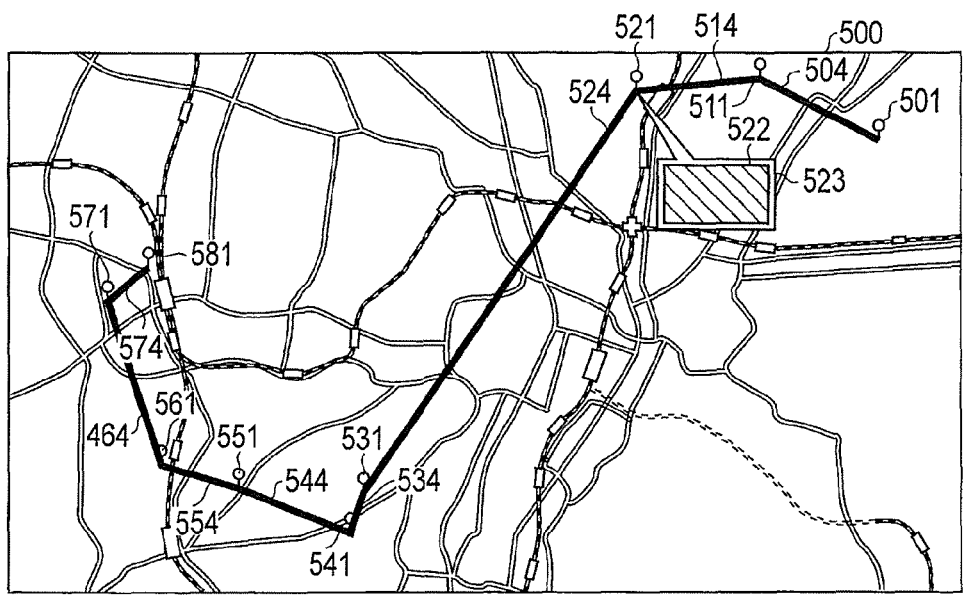
FIG. 9 is an exemplary view showing the example of the photographing location locus display screen.

Note that when the user selects any of these pins by a touch operation, a balloon including an image based on an image file corresponding to the selected pin is displayed on the photographing location locus display screen. For example, as shown in FIG. 9, when the user selects the pin 521 by a touch operation, a balloon 523 is displayed on the map image 500 on the photographing location locus display screen.

Figure 10:
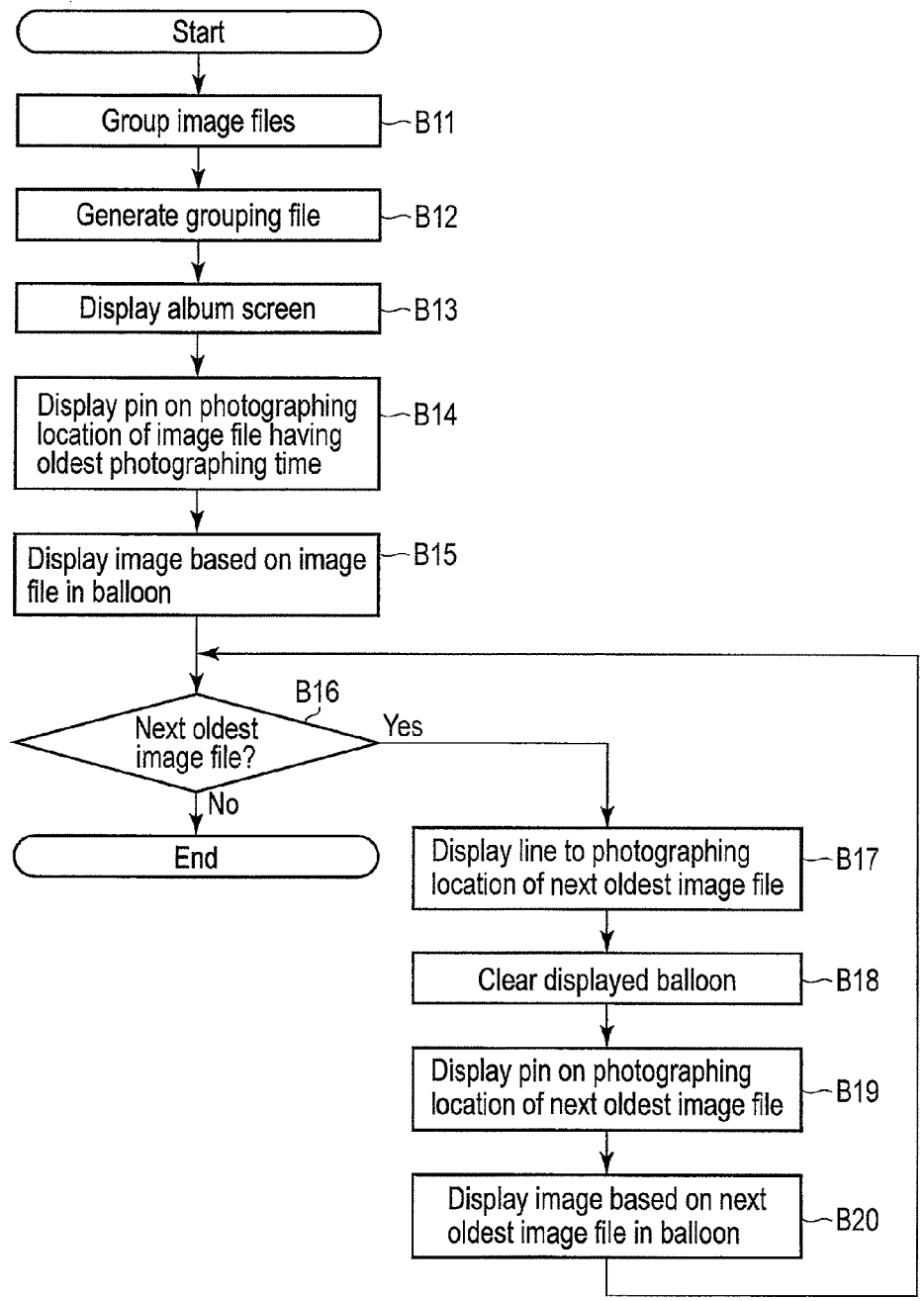
FIG. 10 is an exemplary flowchart showing the sequence for displaying a photographing location locus image.

FIG. 10 is a flowchart showing the sequence for displaying the photographing location locus display screen by the photographing location locus display program 202.

The grouping unit 301 groups a plurality of image files stored in the SSD 109 (step B11). The grouping unit 301 generates the grouping file 313 which describes paths of image files for respective groups (step B12).

The display processor 302 displays the album image on the LCD 17A based on the grouping file 313, image files 311, and map data 312 (step B13). When the user selects a balloon in the album screen by a touch operation, the display processor 302 executes processing for displaying a photographing location locus display screen required to display a locus of photographing locations of image files in a group corresponding to the balloon selected by the touch operation on the LCD 17A.

The display processor 302 executes processing for displaying a photographing location locus display screen including a map image and a pin on a photographing location of an image file having the oldest photographing date on the LCD 17A (step B14). The display processor 302 executes processing for further displaying a balloon including a thumbnail image of the oldest image file on the map image (step B15).

The display processor 302 determines whether or not an image file having the next oldest photographing date and time still remains (step B16). If no next oldest image file remains (No in step B16), the display processor 302 aborts processing. If the next oldest image file remains (Yes in step B16), the display processor 302 displays a line to a photographing location of the next oldest image file (step B17). The display processor 302 then clears the displayed balloon (step B18). The display processor 302 displays a pin on the photographing location of the next oldest image file (step B19). The display processor 302 further displays a thumbnail image of the next oldest image file (step B20). The display processor 302 sequentially executes the processes from step B16.

Figure 11:
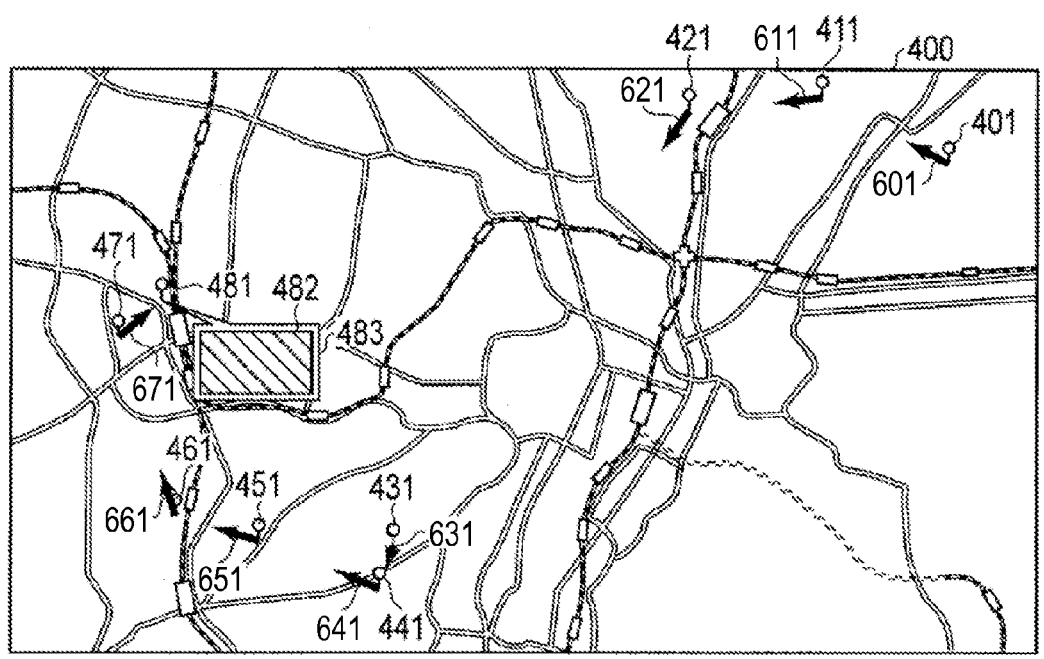
FIG. 11 is an exemplary view showing another example of the photographing location locus display screen.

FIG. 11 shows another example of a photographing location locus display screen displayed on the display screen by the photographing location locus display program.

Note that the display processor 302 may display arrows 601, 611, 621, 631, 641, 651, 661, 671, and 681 in place of the lines, as shown in FIG. 11. The arrows 601, 611, 621, 631, 641, 651, 661, 671, and 681 are displayed on lines each of which connects a pin corresponding to an image file taken at a former timing and that corresponding to an image file taken at a latter timing. Also, starting points (one-end points) of the arrows 601, 611, 621, 631, 641, 651, 661, 671, and 681 are pins corresponding to image files taken at former timings. The arrows 601, 611, 621, 631, 641, 651, 661, 671, and 681 are determined based on the geotag information and the date and time information of image files. Each of arrows 601, 611, 621, 631, 641, 651, 661, 671, and 681 extends from a first pin corresponding to first date and time information regarding photographing of a first timing to a second pin corresponding to second date and time information regarding a second timing of photographing next to the first timing of photographing.

Figure 12:
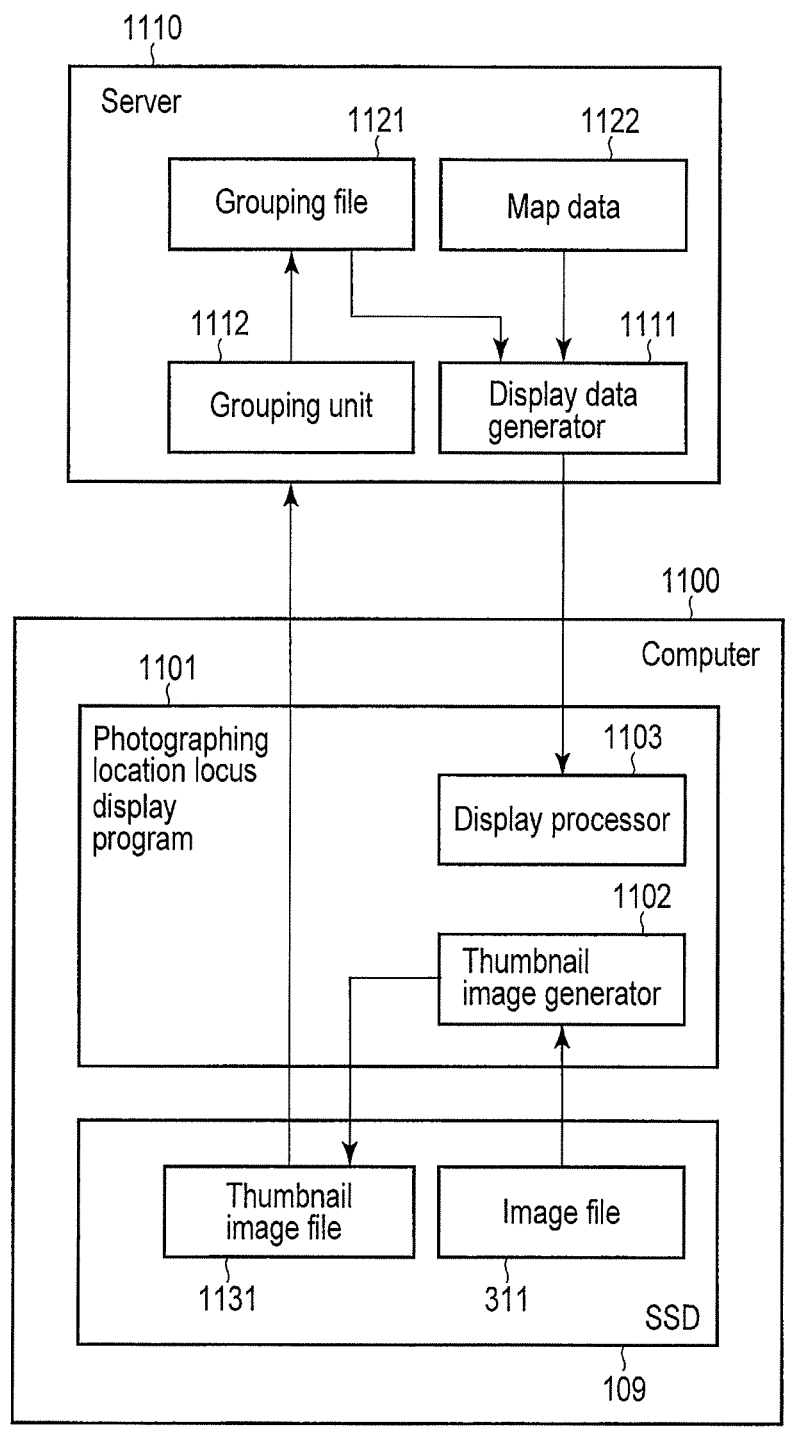
FIG. 12 an exemplary block diagram showing the arrangement of a cloud system according to the embodiment.

Note that a server may execute processing for generating data required to display the album image and photographing location locus screen on the LCD 17A. FIG. 12 is a block diagram showing the arrangement of a cloud system according to the embodiment.

The cloud system includes a computer 1100 and server 1110.

The computer 1100 includes a photographing location locus display program 1101. The photographing location locus display program 1101 includes a thumbnail image generator 1102 and display processor 1103. The thumbnail image generator 1102 generates thumbnail image files 1131 from the image files 311. Thumbnail image data is embedded with EXIF information embedded in an original file. The thumbnail image files 1131 are transmitted to the server 1110. The display processor 1103 executes processing for displaying an album screen and photographing location locus display screen on the LCD 17A based on data transmitted from the server.

The server includes a grouping unit 1111, display data generator 1112, and the like. The grouping unit 1111 groups the thumbnail image files 1131 based on pieces of geotag information and date and time information embedded in the thumbnail image files 1131 transmitted from the computer 1100. The grouping unit 1111 generates a grouping file 1121 which describes pieces of information indicating image files for respective groups. The grouping file 1121 describes pieces of information of image files in turn from an image file having the oldest photographing date and time.

The display data generator 1112 generates display data required to display an album screen including balloons corresponding to respective groups based on the grouping file 1121, thumbnail image files 1131, and map data 1122. The display data is transmitted to the computer 1100. The display processor 1103 of the computer 1100 executes processing for displaying the album screen on the LCD 17A based on the display data transmitted from the server 1110.

When the user selects a certain balloon in the album screen by a touch operation, the display processor 1103 notifies the server 1110 of information indicating the balloon selected by the touch operation. The display data generator 1111 generates display data required to display a photographing location locus display screen corresponding to the selected balloon. The display data is transmitted to the computer 1100. The display processor 1103 of the computer 1100 executes processing for displaying the photographing location locus display screen on the LCD 17A based on the display data transmitted from the server 1110.

Note that the computer 1100 may transmit image files to the server 1110. Alternatively, the computer 1100 may group image files, and may transmit thumbnail images together with information indicating groups.

By displaying a map image, a plurality of objects at positions of the map image based on pieces of location information included in respective first image files, and a first line which connects two positions on the map image based on pieces of location information of two image files having former and latter photographing date and times based on pieces of date and time information on a display screen of a display device, the user can visually and intuitively confirm the photographing locations in an order of photographing date and time.

Since various kinds of processing associated with the photographing location locus display of this embodiment can be implemented by a computer program, this computer program is installed in a normal computer via a computer-readable storage medium storing that computer program, and the installed program is executed, thus easily achieving the same effects as in this embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a storage device configured to store image files comprising location information regarding a location of photographing and time information regarding a timing of photographing; and
   a display processor configured to display, on a screen, a map image, a plurality of objects on the map image, and lines on the map, wherein locations of the plurality of objects correspond to location information of the image files, shapes of the lines are determined based on location information and time information of the image files, a first line is drawn between a first object of a first image file corresponding to first time information regarding a first timing of photographing and a second object of a second image file corresponding to second time information regarding a second timing of photographing next to the first timing of photographing,
   wherein the display processor is configured to display on the map image the first image file corresponding to the first object and remove the second image file from display on the map image when a selection operation is made with respect to the first object.

2. An electronic apparatus comprising:
   a storage device configured to store image files comprising location information regarding a location of photographing and time information regarding a timing of photographing; and
   a display processor configured to display, on a screen, a map image, a plurality of objects on the map image, and arrows on the map, wherein locations of the plurality of objects correspond to the location information of the image files, shapes of the arrows are determined based on the location information and the time information of the image files, and a first arrow extends from a first object of a first image file corresponding to first time information regarding a first timing of photographing to a second object of a second image file corresponding to second time information regarding a second timing of photographing next to the first timing of photographing,
   wherein the display processor is configured to display on the map image the first image file corresponding to the first object and remove the second image file from display on the map image when a selection operation is made with respect to the first object.

3. The apparatus of claim 2, wherein the image files comprise the first image file and the second image file which is photographed next to the first image file, wherein the first image file comprises first location information, and the second image file comprises second location information,
   the display processor is configured to display the map image and the first object on a first position of the map image corresponding to the first location information,
   the display processor is configured to display the map image, the first object on the map image, and the first arrow on the map image, the first arrow extends from the first position to a second position of the map image corresponding to the second location information, and the display processor is configured to display the map image, the first object, the first arrow, and the second object on the second position.

4. The apparatus of claim 3, wherein the display processor is configured to display the map image, the first object, and a first image corresponding to the first image file, the display processor is configured to display the map image, the first object, the first image, and the first arrow, and the display processor is configured to display the map image, the first object, the first arrow, the second object, and a second image corresponding to the second image file.

5. The apparatus of claim 2, wherein the display processor is configured to display a third image corresponding to a third image file corresponding to a third object included in the plurality of objects when a selection operation is made with respect to the third object.

6. A computer-readable, non-transitory storage medium configured to store a computer program which is executable by a computer comprising a storage device configured to store image files comprising location information regarding a location of photographing and time information regarding a timing of, the computer program controlling the computer to execute functions of:

displaying, on a screen, a map image, a plurality of objects on the map image, and lines on the map, wherein locations of the plurality of objects correspond to the location information of the image files, shapes of the lines are determined based on the location information and time information of the image files, a first line is drawn between a first object of a first image file corresponding to first time information regarding a first timing of photographing and a second object of a second image file corresponding to second time information regarding a second timing of photographing next to the first timing of photographing;

displaying, on the map image, the first image file corresponding to the first object when the first object is selected on the map image;

displaying, on the map image, the second image file corresponding to the second object when the second object is selected on the map image; and removing the first image file from display on the map image when the second object is selected on the map image.

7. A computer-readable, non-transitory storage medium configured to store a computer program which is executable by a computer comprising a storage device configured to store image files comprising location information regarding a location of photographing and time information regarding a timing of, the computer program controlling the computer to execute functions of:

displaying, on a screen, a map image, a plurality of objects on the map image, arrows on the map image, locations of the plurality of objects corresponding to the location information of the image files, and arrows on the map, wherein locations of the plurality of objects correspond to the location information of the image files, shapes of the arrows are determined based on location information and time information of the first location information, and an arrow extends from a first object of a first image file corresponding to first time information regarding photographing of a first timing to a second object of a second image file corresponding to second time information regarding a second timing of photographing next to the first timing of photographing;

displaying, on the map image, the first image file corresponding to the first object when the first object is selected on the map image;

displaying, on the map image, the second image file corresponding to the second object when the second object is selected on the map image; and removing the first image file from display on the map image when the second object is selected on the map image.

* * * * *